United States Patent
Jordan et al.

(10) Patent No.: US 9,981,717 B2
(45) Date of Patent: May 29, 2018

(54) ELECTRONIC SHIFTING SYSTEMS AND METHODS

(71) Applicant: SRAM, LLC, Chicago, IL (US)

(72) Inventors: Brian Jordan, Chicago, IL (US); Todd Squires, Bull Valley, IL (US)

(73) Assignee: SRAM, LLC, Chicago, IL (US)

( * ) Notice: Subject to any disclaimer, the term of this patent is extended or adjusted under 35 U.S.C. 154(b) by 0 days. days.

(21) Appl. No.: 15/226,989

(22) Filed: Aug. 3, 2016

(65) Prior Publication Data

US 2016/0339996 A1 Nov. 24, 2016

Related U.S. Application Data

(62) Division of application No. 14/534,363, filed on Nov. 6, 2014, now Pat. No. 9,540,071, which is a division of application No. 13/712,616, filed on Dec. 12, 2012, now Pat. No. 8,909,424.

(60) Provisional application No. 61/712,636, filed on Oct. 11, 2012.

(51) Int. Cl.
| | |
|---|---|
| *B62K 23/02* | (2006.01) |
| *B62M 25/08* | (2006.01) |
| *B62M 9/122* | (2010.01) |
| *B62M 9/132* | (2010.01) |
| *F16H 59/04* | (2006.01) |
| *H04W 74/08* | (2009.01) |
| *B62J 99/00* | (2009.01) |

(52) U.S. Cl.
CPC .............. *B62M 25/08* (2013.01); *B62J 99/00* (2013.01); *B62K 23/02* (2013.01); *B62M 9/122* (2013.01); *B62M 9/132* (2013.01); *F16H 59/044* (2013.01); *H04W 74/08* (2013.01); *B62J 2099/0013* (2013.01); *Y10T 74/2003* (2015.01)

(58) Field of Classification Search
CPC ...... B62M 25/08; B62M 9/132; B62M 9/122; Y10T 74/2003; F16H 59/044; B62K 23/02; B62J 99/00; B62J 2099/0013; H04W 74/08
See application file for complete search history.

(56) References Cited

U.S. PATENT DOCUMENTS

| | | | |
|---|---|---|---|
| 5,870,381 | A | 2/1999 | Kawasaki |
| 6,023,646 | A | 2/2000 | Kubacsi et al. |
| 6,204,775 | B1 | 3/2001 | Kubacsi |
| 6,623,389 | B1 | 9/2003 | Campagnolo |
| 7,274,907 | B1 | 9/2007 | Perotti |
| 7,623,931 | B2 | 11/2009 | Campagnolo |
| 7,704,173 | B2 | 4/2010 | Ichida |

(Continued)

FOREIGN PATENT DOCUMENTS

| | | |
|---|---|---|
| EP | 0841243 | 5/1998 |
| EP | 1759971 | 3/2007 |

(Continued)

*Primary Examiner* — Richard M Camby

(57) ABSTRACT

The invention provides a wireless control system for a bicycle, including at least one shift unit including a shift actuator, and a master control unit in communication with the shift actuator. The master control unit transmits on a channel and listens for noise on the channel. When the master control unit receives an input signal from the shift actuator, the master control unit transmits a plurality of shift signals corresponding to the input signal for a message duration time if the channel is free of noise.

14 Claims, 8 Drawing Sheets

(56) References Cited

U.S. PATENT DOCUMENTS

| | | |
|---|---|---|
| 7,761,212 B2 | 7/2010 | Takebayashi |
| 8,271,058 B2 | 9/2012 | Rhee |
| 8,655,561 B2 | 2/2014 | Kitamura |
| 8,721,495 B2 | 5/2014 | Kitamura |
| 8,874,338 B2 | 10/2014 | Miglioranza |
| 8,918,665 B2 | 12/2014 | Low |
| 2004/0063528 A1 | 4/2004 | Campagnolo |
| 2004/0235597 A1 | 11/2004 | Gudzero |
| 2005/0143145 A1 | 6/2005 | Maekawa |
| 2005/0255831 A1 | 10/2005 | Kato |
| 2009/0102628 A1 | 4/2009 | Takebayashi |
| 2009/0240858 A1 | 9/2009 | Takebayashi |
| 2009/0315692 A1 | 12/2009 | Miki et al. |
| 2010/0112950 A1 | 5/2010 | Haartsen |
| 2010/0214222 A1 | 8/2010 | Yen |
| 2011/0045875 A1 | 2/2011 | Rhee |
| 2011/0320093 A1 | 12/2011 | Kitamura |
| 2012/0035011 A1 | 2/2012 | Menachem |
| 2016/0339986 A1* | 11/2016 | Jordan .................. B62K 23/02 |

FOREIGN PATENT DOCUMENTS

| | | |
|---|---|---|
| EP | 1475302 | 7/2007 |
| EP | 2399813 | 12/2011 |

* cited by examiner

ELECTRONIC SHIFTING SYSTEMS AND METHODS

REFERENCE TO RELATED APPLICATIONS

This application is a divisional of U.S. patent application Ser. No. 14/534,363, filed Nov. 6, 2014, which is a divisional of U.S. patent application Ser. No. 13/712,616, filed Dec. 12, 2012, now U.S. Pat. No. 8,909,424, claiming the benefit of U.S. Provisional Patent Application No. 61/712,636, filed Oct. 11, 2012.

BACKGROUND OF THE INVENTION

The invention relates to bicycle gear changing systems. In particular, the invention is directed to systems including wirelessly actuated bicycle gear changers. The systems include bicycle gear changers controlled by a wireless control signal, wherein the wireless control signal is generated by a bicycle control component.

One prior art electromechanical shifting system required a wireless transmitter and receiver to be on continuously. To conserve energy, a very low-power & low-range transceiver was utilized. However, the low-power transceiver suffered from poor wireless performance. A more recent system requires a periodic beacon signal which will also always consume battery power.

There is a need for a highly reliable and more secure wireless control systems for bicycles. The invention satisfies the need.

SUMMARY OF THE INVENTION

The invention uses a relatively higher-power transmitter and receiver, but power is conserved by turning the transmitter and receiver off when not in use and by power cycling the transmitter and receiver when the bicycle is active. The inventive systems may be made more secure by requiring physical access/interaction to pair the shifters (i.e., the control componentry) with the gear changers.

One aspect of the invention provides a wireless control system for a bicycle, including at least one shift unit including a shift actuator and a master control unit in communication with the shift actuator. The master control unit transmits on a channel and listens for noise on the channel and after receiving an input signal from the shift actuator and transmits a plurality of shift signals corresponding to the input signal for a message duration time if the channel is free of noise.

DETAILED DESCRIPTION OF THE INVENTION

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

Figure 1:
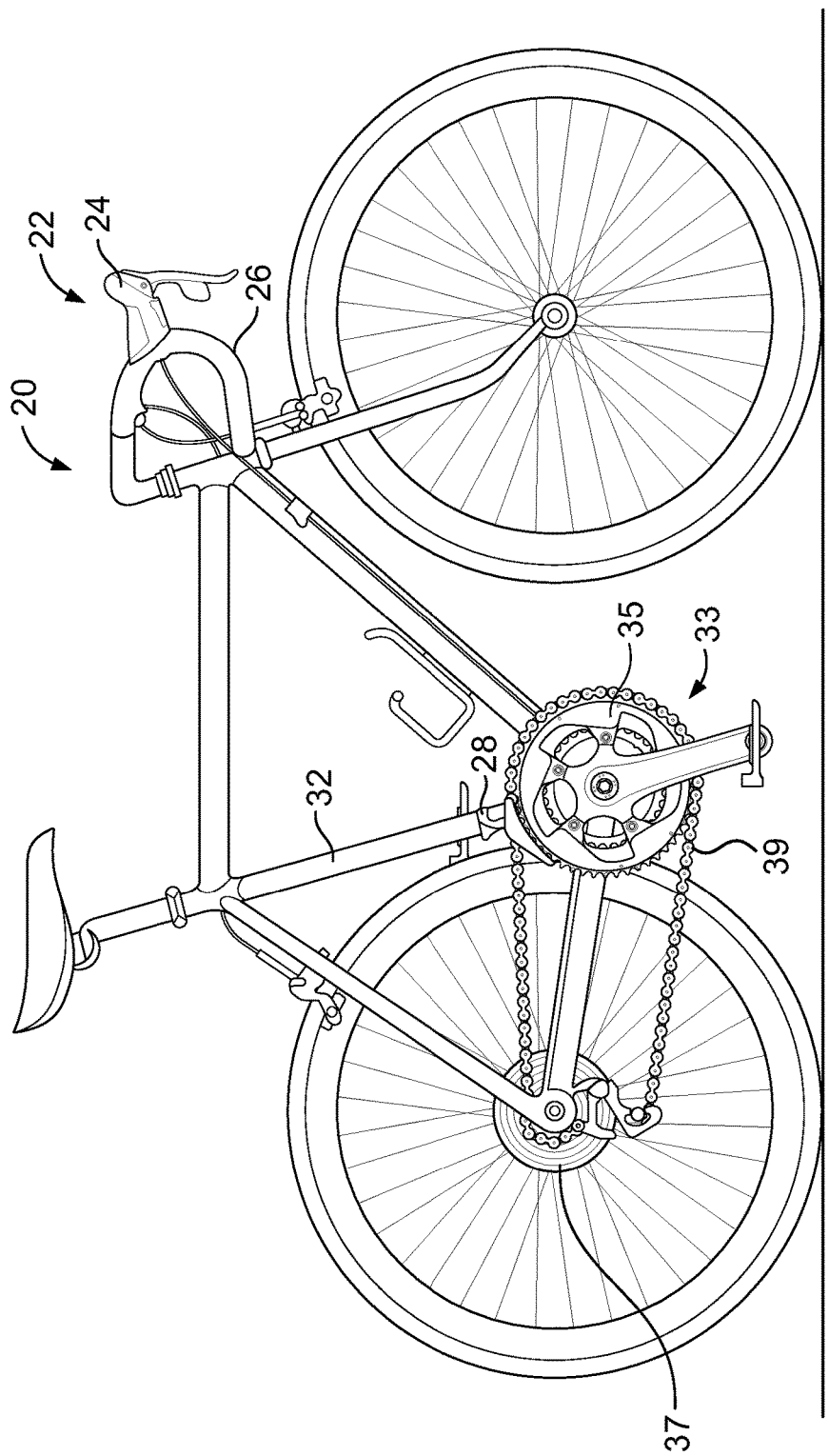
FIG. 1 is a side view of a drop-bar style bicycle with wireless components installed thereon.

Referring to FIG. 1, a bicycle 20 with a drop-bar type handlebar is shown with a wireless communication/control system 22 in accordance with one embodiment of the invention. The wireless control system 22 includes at least one shift unit 24 (shifter) which may be mounted to a bicycle handlebar 26 attached to the bicycle. The bicycle 20 wireless control system 22 also may have one or both of an electromechanical front gear changer 28 and an electromechanical rear gear changer 30 mounted to the bicycle frame 32 part of the bicycle 20. The gear changers 28, 30 may be derailleurs or internal gear hubs, for example. The control system 22 may be usable with other systems and/or components of the bicycle 20, such as suspension components and systems, controllable seat posts, power meters, cadence meters, lighting, bicycle computers, and so on, in addition to gear changers or in the alternative to gear changers. For context, the bicycle 20 will typically have a drive assembly 33, with one or more front chainrings 35 connected to a plurality of rear sprockets 37 by a chain 39 as is known in the art.

Figure 2:
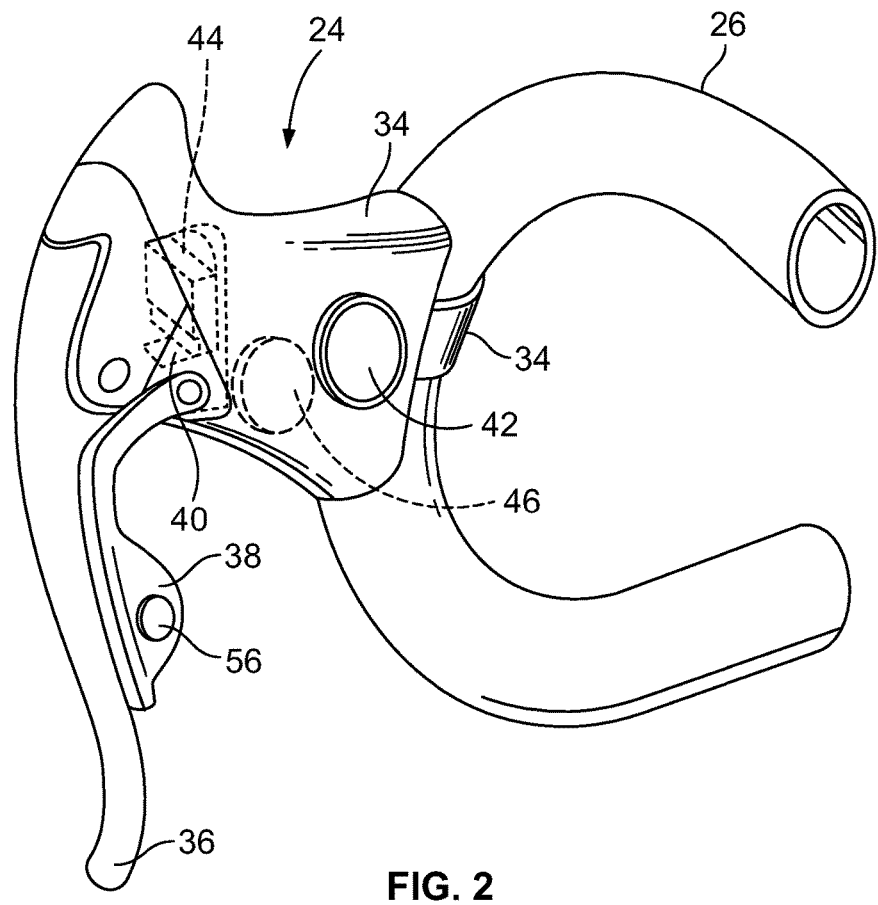
FIG. 2 is a view of a shifter/brake assembly with an integrated master control unit (MCU).

FIG. 2 shows a drop bar shift unit 24 in greater detail. The shift unit 24 may include a brake support bracket 34 mountable to a handlebar, a brake lever 36, a shift lever 38, (which is one form of a shift actuator, e.g., a button or the like), operatively coupled to a shift switch 40, a front gear changer shift toggle button 42, and a master control unit 44, and a power source such as a battery 46. Shift switch 40 may be actuated by any suitable actuator/device, such as a momentary contact button, for example.

Figure 6:
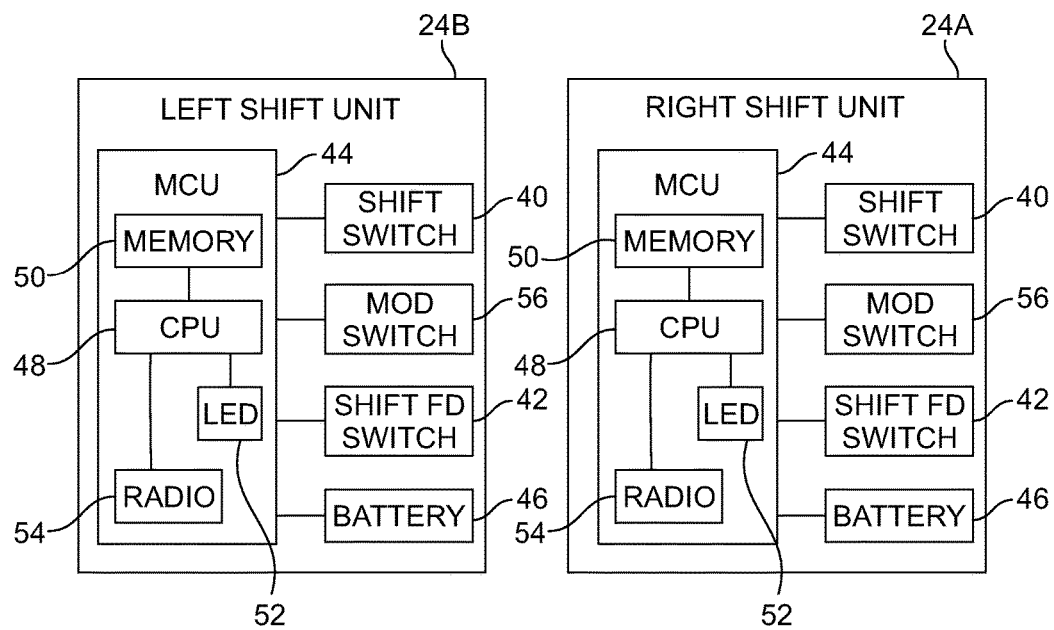
FIGS. 6-9 are schematic views of a wireless communication/control system.

Referring also to the embodiment of FIG. 6, the master control unit 44 may receive input signals from the shift switch 40 and front gear changer (FD) shift toggle button 42, and also includes a CPU 48 provided in communication with the shift switch for processing the input signals, a memory component 50 in communication with the CPU, an optional indicator such as a LED 52 to display status signals generated by the CPU, and a wireless transmitter and receiver 54. It will be noted that the term "transmitter and receiver", as used herein may include a transceiver, transmitter-receiver, or radio, and contemplates any device or devices, separate or combined, capable of transmitting and receiving wireless signals, including shift signals or control, command or other signals related to some function of the component being controlled.

Shift units 24 may be supplied in pairs 24a, 24b and are typically installed on the handlebar 26, or a similar component, with one shift unit located to be operated with the right hand and the other to be operated with the left hand. When two separate shift units are employed, there may be a pair of master control units (MCU) 44 in the system 22, one in each of the two units 24*a*, 24*b*. Shift units 24 may be positioned anywhere within reach of the user, and multiple units and or shift switches 40, or the like, may be positioned thereon, such as in the type of bicycle known as a time trial bicycle which can have shift units on both the bars and bar extensions.

In one embodiment, for example, the CPU 48 used may be an Atmel ATmega324PA microcontroller with an internal eeprom memory and the transmitter and receiver 54 used may be an Atmel AT86RF231 2.4 GHz transceiver utilizing AES encryption and DSS spread spectrum technology supporting 16 channels and the IEEE 802.15.4 communication protocol. Other suitable CPUs and wireless transmitter and receivers are contemplated.

In one embodiment of the wireless control system 22, the shift lever 38 on the right shift unit 24*a*, when actuated, causes the generation of a shift signal corresponding to an upshift, which is actuatable by the rear gear changer 30. The shift lever on the left shift unit 24*b*, when actuated, causes the generation of a shift signal corresponding to a downshift, which is actuatable by the rear gear changer 30. Upshift corresponds to a gear shift to a higher gear (e.g., smaller rear sprocket 37) and downshift corresponds to a gear shift to a lower gear (e.g., larger rear sprocket 37). A front shift actuator 42, which may be in the form of a button, and is an optional element, may be provided on both shift units 24 and when operated, transmits a toggle front shift signal to toggle the front gear changer 28. Therefore, each MCU 44 of each shift unit 24 can wirelessly transmit shift signals that are receivable and may be actuatable by each gear changer.

It may also be desirable to add a modifier actuator 56 to, for example, the shift unit 24. A modifier actuator 56, which may be in the form of a button, does nothing when operated alone, but when operated in combination with another actuator causes the generation of a different type of signal (i.e., not a shift signal). For example, when the shift lever 38 of unit 24*a* is pressed in combination with the modifier actuator 56 a "shift alignment inboard" or trim command, or the like, can be issued instead of an "upshift" command. The modifier actuator 56 may be located on the shift lever 38 and be in communication with the MCU 44.

Figure 3:
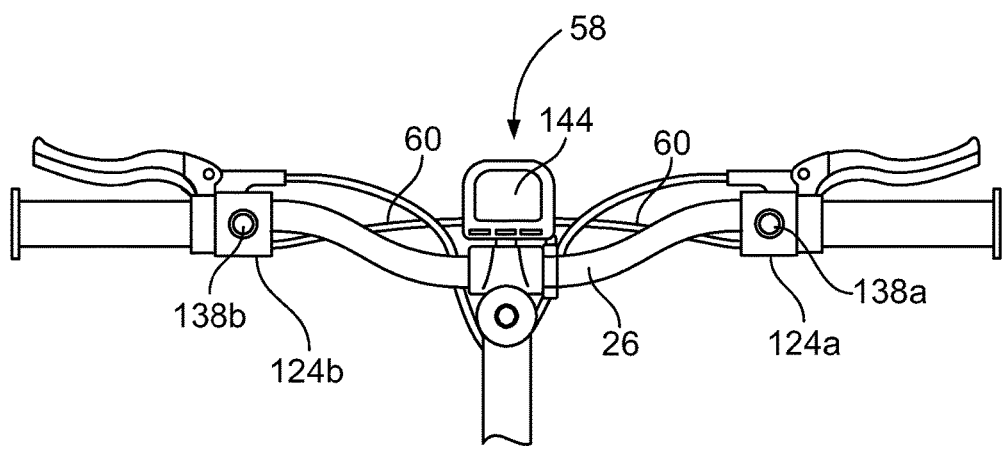
FIG. 3 is a flat type bar with shift units wired to a discrete control unit.
Figure 8:
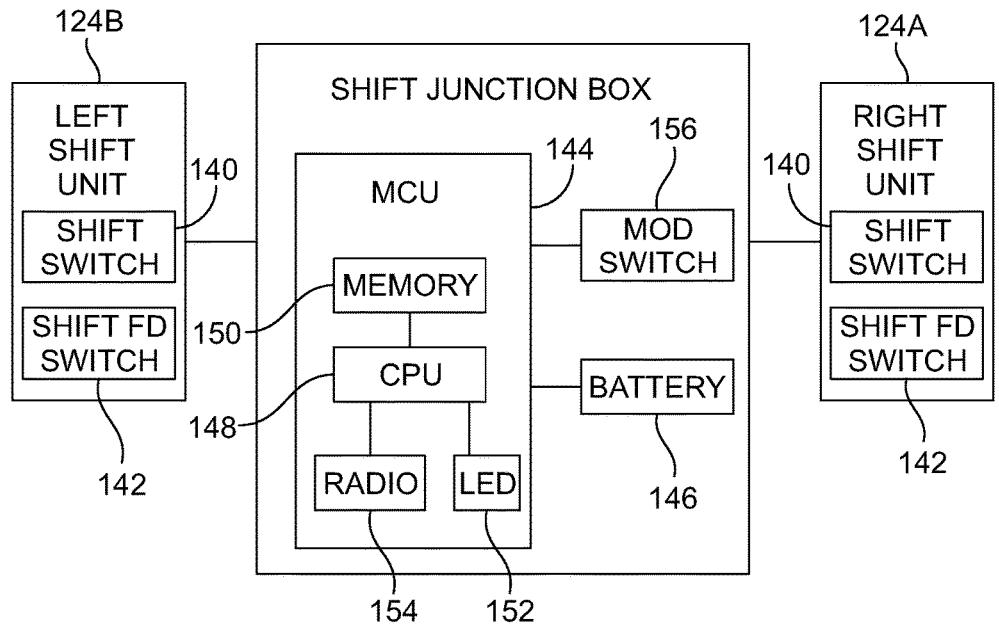

FIG. 3 shows another embodiment with the system 22 adapted to a flat-bar application. In this embodiment, right and left shift units 124*a*, 124*b* are provided. A shift junction box 58 may be connected by signal wires 60 to the right shift unit and left shift units 124*a*, 124*b*. A single master control unit 144 may be located in the shift junction box 58 that receives signals from the left and right shift units 124*a*, 124*b* (FIG. 8). The single master control unit 144 includes components similar to those of MCU 44 in the shift units 24. Specifically, the MCU 144 includes a CPU 148 in communication with the left and right shift units 124*a*, 124*b*, a memory component 150 in communication with the CPU, a transmitter and receiver component 154, and a LED 152 to indicate operating conditions of the MCU 144. A battery 146 provides power to the MCU 144 and a modification actuator 156 is provided to modify the operation of the MCU.

Although this flat-bar embodiment is shown with a shared single master control unit 144, two master control units could be employed. Alternatively, junction box 58 and shared master control unit 144 could be employed in the drop bar version described above. Each of the shift units 124*a*, 124*b* may have a shift switch 140, which is responsive to the shift levers 38 of shift unit 24 described above.

Figure 4:
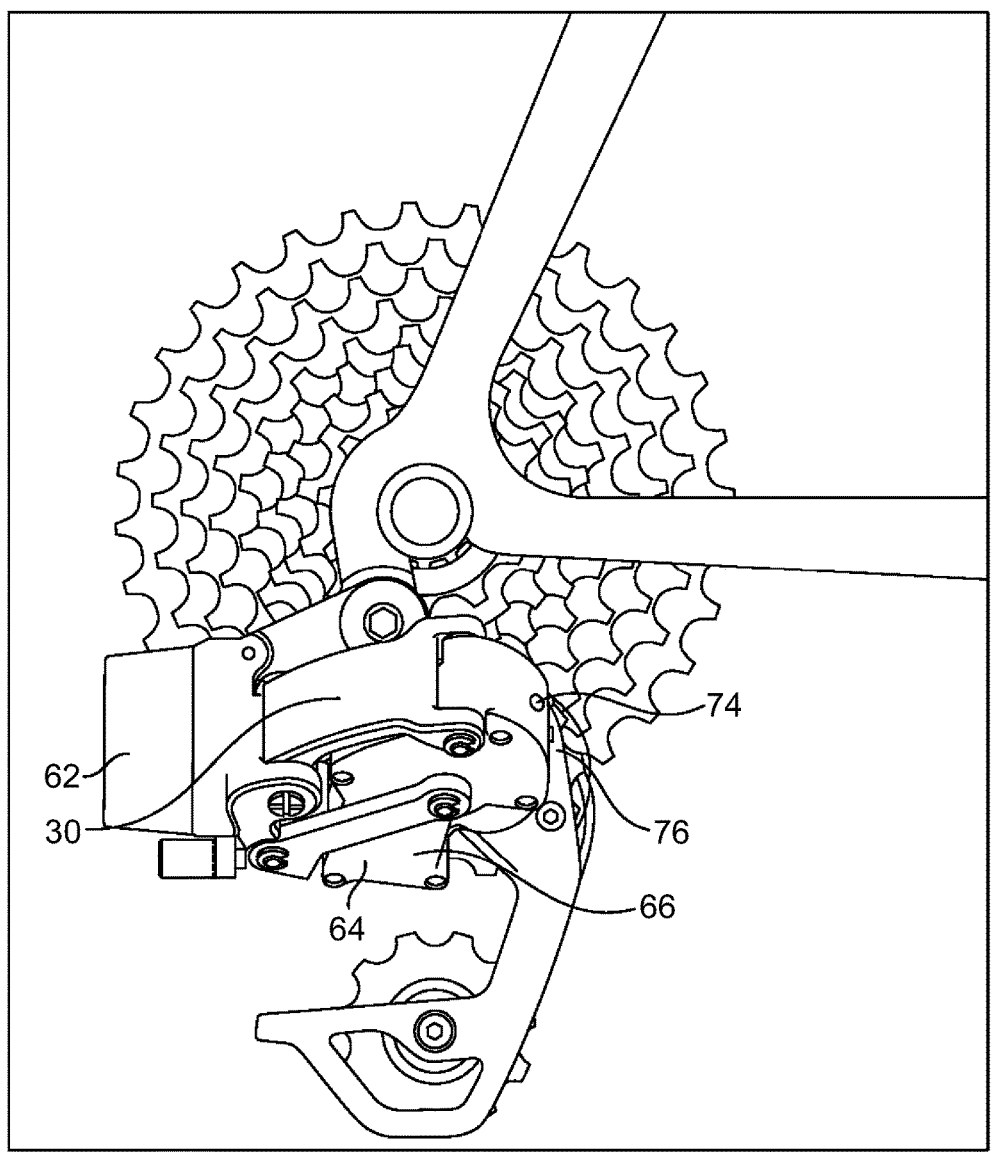
FIG. 4 is a rear gear changer according to an embodiment of the present invention.

An embodiment of an electromechanical rear gear changer 30 (RD) is shown in FIG. 4. In general, electromechanical gear changers are known in the art. The present rear gear changer includes a power source 62 (battery), a motor unit 64, and a gear changer control unit 66 (SCU or "slave control unit"). The gear changer control unit 66 (FIG. 7) may include a CPU 68 to process signals/commands, and the like, a wake sensor 70 operatively connected thereto, a memory component 72, a function button 74, an indicator such as a LED 76, an output 78 to send control signals to the motor unit 64, and a transmitter and receiver 80 for sending and receiving wireless signals. The motor unit 64 receives and executes position trim commands and/or gear change commands from the gear changer control unit 66.

Figure 5:
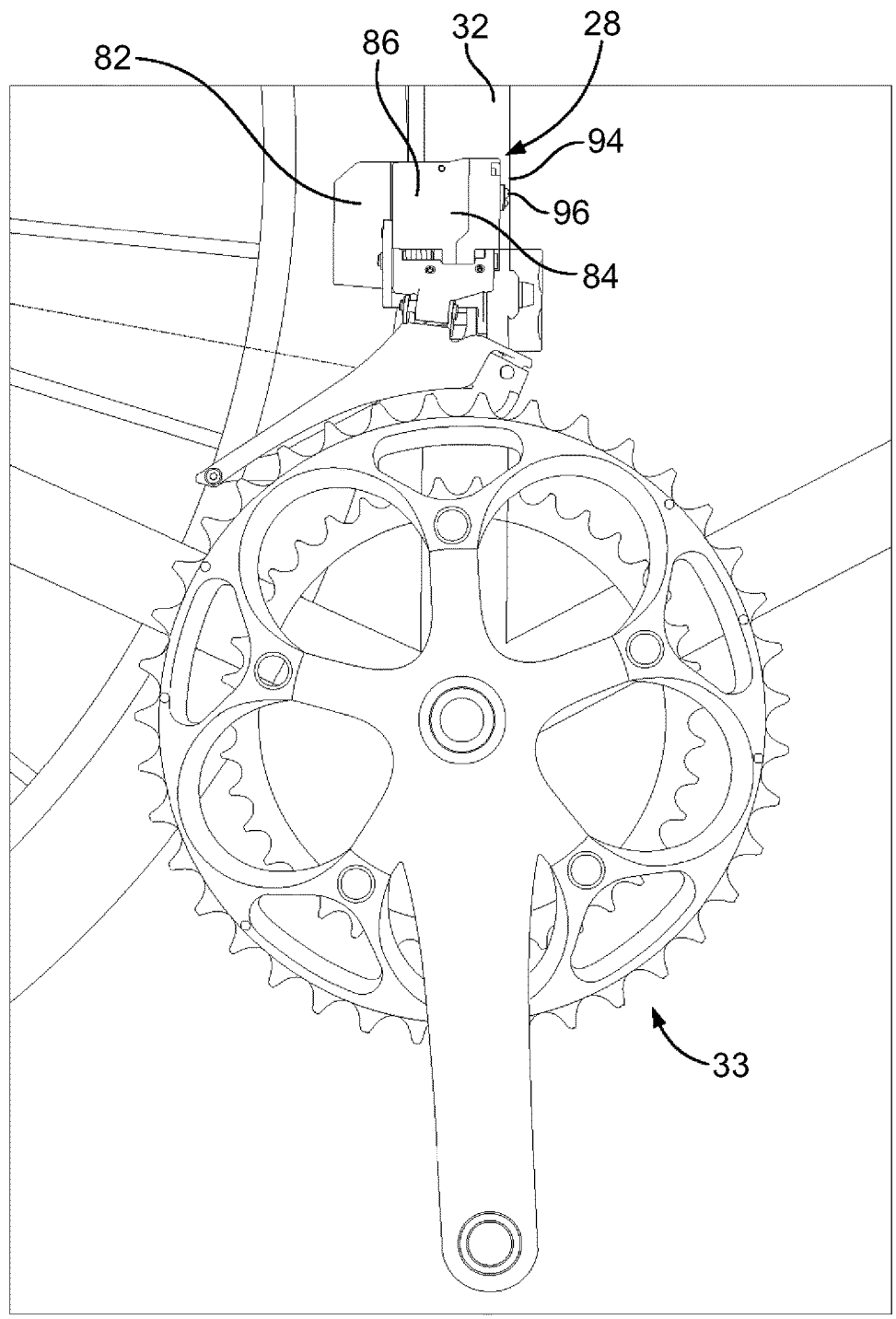
FIG. 5 is a front gear changer according to an embodiment of the present invention.

An embodiment of an electromechanical front gear changer 28 (FD) is shown in FIG. 5. Like the rear gear changer described above, the front gear changer has a power source 82 (battery), a motor unit 84, and a gear changer control unit 86 (SCU). The gear changer control unit 86 (FIG. 7) may include a CPU 88 to process signals/commands and the like, a wake sensor 90 operatively connected thereto, a memory component 92, a function button 94, an indicator such as a LED 96, an output 98 to control/operate the motor unit 84, and a transmitter and receiver 100 for sending and receiving wireless signals, which may also be referred to as a gear changer transmitter and receiver. The motor unit 84 receives and executes position and/or gear change commands from the gear changer control unit 86. In the illustrated embodiment, the front gear changer shifts between two chainrings. Alternatively, more than two chainrings are contemplated. The CPU 88 may also be configured to toggle shift the front gear changer 28 between two chainrings when the function button 94 is pressed then released.

Figure 9:
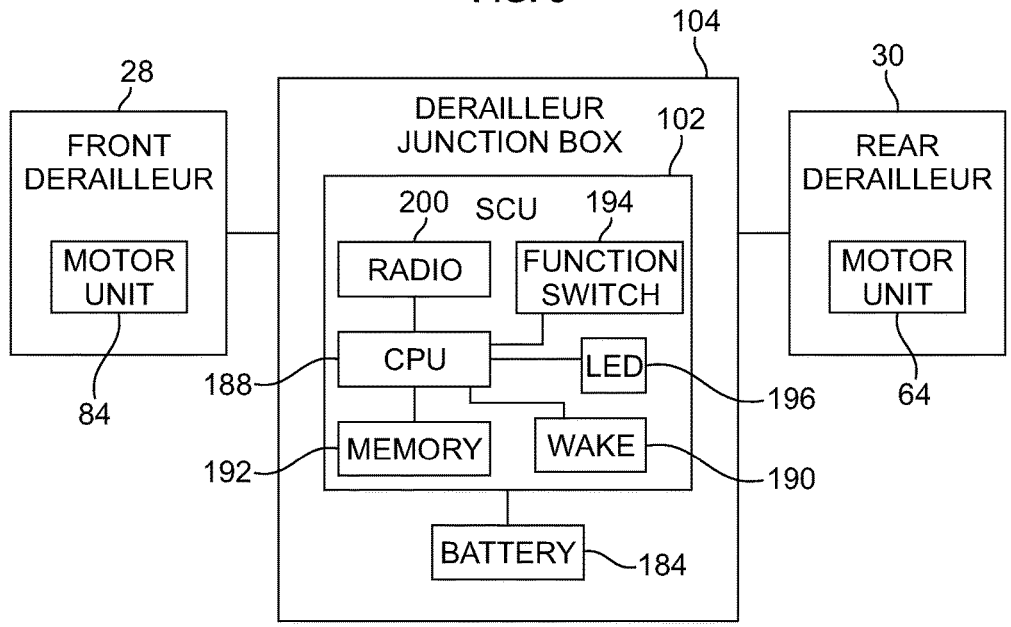

Referring also to FIG. 9, while the rear gear changer 30 and front gear changer 28 is described as each having a gear changer control unit, a single shared gear changer control unit 102 could be employed. The shared gear changer control unit 102 shown is located in a gear changer junction box 104, but could also be located within the rear gear changer 30 or front gear changer 28. The shared gear changer control unit 102 may include a power source 184 (battery). The gear changer control unit 102 may include a CPU 188 to process signals from the MCU 144, a wake sensor 190, a memory component 192 coupled to the CPU, a function switch 194, a LED 196, and a transmitter and receiver 200 configured to send and receive wireless signals.

In one embodiment, the CPU 88 or 188 may be an Atmel ATmega324PA 8-bit RISC microcontroller with an internal eeprom memory. The transmitter and receiver 100, 200 may be an Atmel AT86RF231 2.4 GHz transceiver utilizing AES encryption and DSS spread spectrum technology supporting 16 frequency channels and the IEEE 802.15.4 communication protocol.

Channel Selection

It is possible to set the system 22 to one of a plurality of different selectable transmitter and receiver frequency channels to avoid crosstalk with other systems in the vicinity. A device may be designated in the system 22 to be the channel master. The channel master device may be the rear gear changer 30. Prior to pairing devices, (i.e., the shift unit(s) and gear changer(s)), the rear gear changer 30 would be set to a particular transmitter and receiver frequency channel. This could be accomplished by pressing the function button 74 in a certain sequence, or could be accomplished with a selector switch, or could be accomplished by wireless communication with a device designed to perform such a task. It is considered that it would be within the skill of the ordinary artisan to accomplish such a task.

Pairing

The components of the wireless control system 22 are paired to enable wireless communication therebetween. Referring to FIG. 2 and FIGS. 4-7, each Master Control Unit 44 has a unique "device ID" value and a "device type" value permanently stored in the MCU memory component 50. The "device type" value indicates the type of device it is, for example: "right shifter unit" or "left shifter unit".

For purposes of illustrating an embodiment of a pairing operation, an example with a front gear changer will be illustrated. It will be understood that the basic steps will be the same for a rear gear changer. The front gear changer 28 containing a gear changer control unit 86 (SCU) is paired with a shifter 24 containing a MCU 44 as follows. When a mode changing mechanism, which may be in the form of a function button 94 on the gear changer, is pressed for a pre-determined period of time, the SCU 86 of the gear changer enters or is converted to a pairing mode. The SCU 86 may slowly flash the LED 96 on the gear changer 28 to indicate that it is in pairing mode and turn on the SCU transmitter and receiver 100. At this time, the receiver part of transmitter and receiver 100 in the SCU 86 scans transmitter and receiver channels, listening for transmitted signals, wherein listening may also be referred to as monitoring. Next, a shift lever/button 38 on the shift unit 24 with a MCU 44 is pressed and held, causing the MCU to transmit a repeating shift signal that contains the "device ID" and "device type" as part of the signal. When the SCU 86 in the gear changer 28 detects the repeating shift signal from a MCU 44, the SCU may change the LED 96 to solid on. The SCU receiver part of transmitter and receiver 100 continues to listen for a repeating shift signal from the MCU 44 of the shifter for a pre-determined time period, which may be about two seconds. Once the SCU 86 of the gear changer 28 has determined that it has received a shift signal from the MCU 44 for the required period of time, the SCU exits the pairing mode and stores the "device ID" in the SCU memory component 92 in a space reserved for that "device type". If the SCU 86 is the channel master in the system 22, it will also send a signal to instruct the MCU 44 in the paired shifter 24 to operate on a particular channel. The shifter 24 and gear changer 28 are now paired and the gear changer's SCU 86 will respond to commands from the MCU 44 of the paired shifter.

The memory 92 of the SCU 86 of the gear changer 28 will only record one device ID for each device type. If a shifter 24 with a device id of "234" is paired with a rear gear changer 30, and later another shifter 24 with the device ID "154" is paired with the rear gear changer, the SCU 72 memory value "234" in the "device type" space will be overwritten with the new value "154," and the rear gear changer 30 will no longer respond to the shifter 24 of device ID "234."

Figure 7:
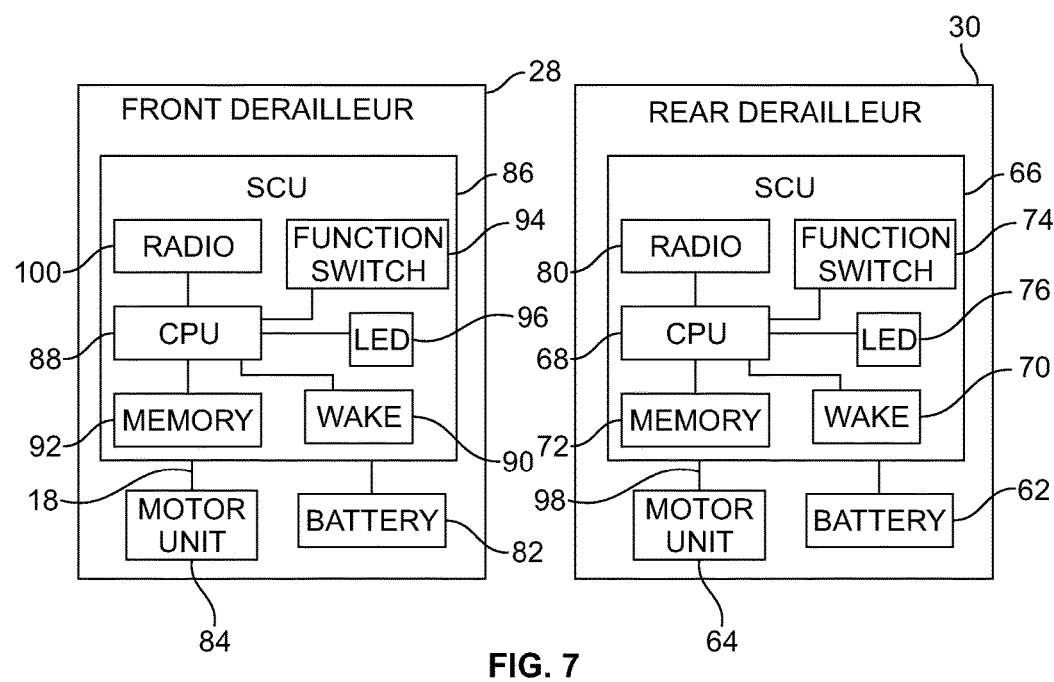

An embodiment of the wireless system 22 has right and left shifters 24a, 24b; each with a MCU 44, and a front gear changer 28 and a rear gear changer 30, each with a SCU 86, 66 (FIGS. 6 and 7). Therefore, it will be understood that the pairing process will be repeated four (4) times for this embodiment. The rear gear changer 30 will be paired to each of the right and left shifters 24a, 24b and the front gear changer 28 will be paired to each of the right and left shifters. This creates a highly secure system because physical access is required to press the buttons on the components to pair the devices. Further, each gear changer 28, 30 will respond only to shifters with which they have been paired. If the operator verifies that each shifter 24a, 24b controls each of the gear changers 28, 30, they can be confident that no unauthorized shifters have been paired. In an alternative embodiment, where a pair of shifters 124a, 124b shares a MCU 144 or the front and rear gear changers 28, 30 shares a SCU, the number of pairing steps will be reduced.

Wake Sensor

Conserving power on battery powered wireless devices is a design consideration and one contemplated by embodiments of the invention. If electronic devices are left on continuously, batteries tend to be quickly depleted. Therefore, various strategies may be implemented to conserve battery power. The MCU 44 connected with the shift unit(s) 24 may be configured to sleep, i.e. are in a relatively low-power state when the bicycle/system is inactive. During this time, the CPU 48 is in the low power state (sometimes known as standby or sleep mode) and the transmitter and receiver 54 is turned off. The MCU 44 only wakes (becomes fully powered and operational) and transmits signals when a switch or button is activated, otherwise it sleeps.

Figure 10:
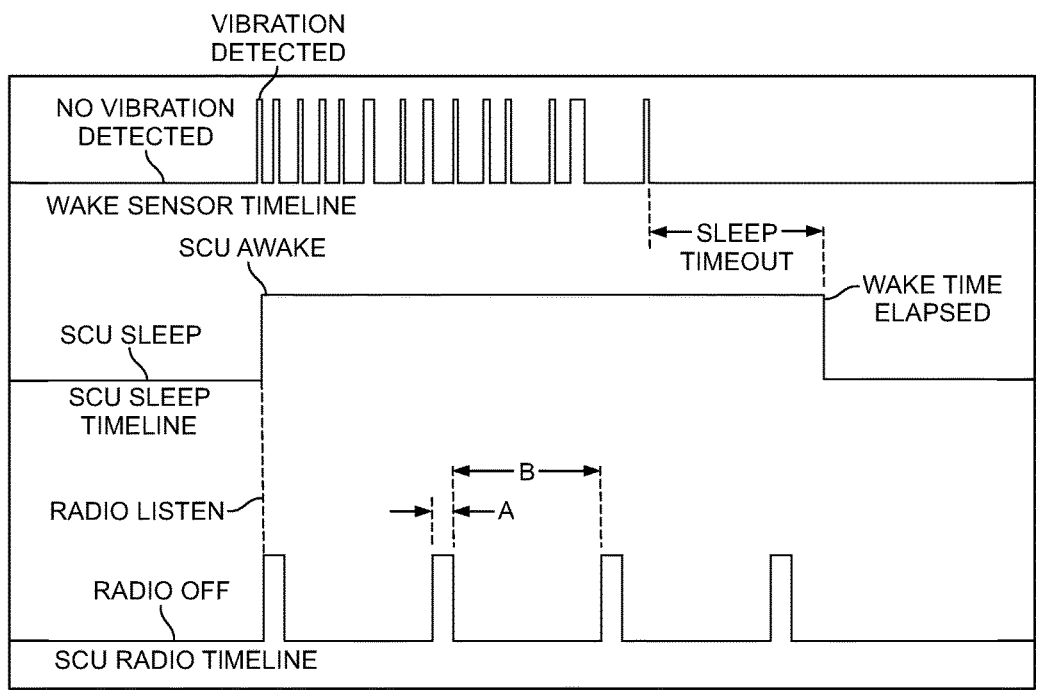
FIG. 10 is a wake/sleep timeline of a gear changer control unit (SCU).

For example, the SCU 66 in the gear changer 30 may receive control signals from the MCU 44 or, in some cases, other SCUs. If the transmitter and receiver 80 is left on continuously, the battery 62 would be quickly depleted. The SCU 66 may include a wake unit 70 to determine and signal when the bicycle is being used. In one embodiment, for example, a SignalQuest SQ-MIN-200 or an Freescale Semiconductor MMA8451Q vibration sensor may be used as a sensor for the wake unit. When operating a bicycle, vibrations are caused by uneven road surfaces and drivetrain motion, which are easily detected by sensors (not shown). Other sensors could be used for the wake unit 70, such as accelerometers or magnetic reed switches configured to detect magnets attached to moving elements of the bicycle 20. When the bicycle 20 is operated, vibration or movement is detected and the wake unit 70 sends a wake signal to wake the SCU 66 (FIG. 10). The SCU 66, upon becoming fully powered and operational from a wake signal from the vibration sensor, becomes awake as long as it receives wake signals from the wake unit 70. If wake signals are not received for a period that exceeds a predetermined sleep timeout value, the SCU 66 will go back to sleep. The duration of the sleep timeout may be about 30 seconds.

Transmitter and Receiver Timing

Power consumption can be further reduced by frequently turning transmitter and receivers 80, 100 on and off according to a predetermined or given period or cycle when the SCU 66, 86 is awake. When the SCU 66, 86 receives a signal from the wake sensor 70, 90 it enters an awake mode, becoming fully powered and operational. During the awake mode, the SCU 66, 86 turns the transmitter and receiver 80, 100 "on" to monitor for shift signals for a listen time A, which may be known as a listen mode, and then "off" for a wait time B, which may be known as a non-listen mode, to conserve energy as shown on timeline SCU on the chart. The total of one cycle of time A and B defines a given awake mode cycle period or awake mode cycle time. Typically, listen mode time A might be about 5 ms and wait time or non-listen mode B might be about 45 ms. In this state, the SCU transmitter and receiver 80, 100 is on (in listen mode) only about 10% of the time of the awake mode cycle time.

Figure 11:
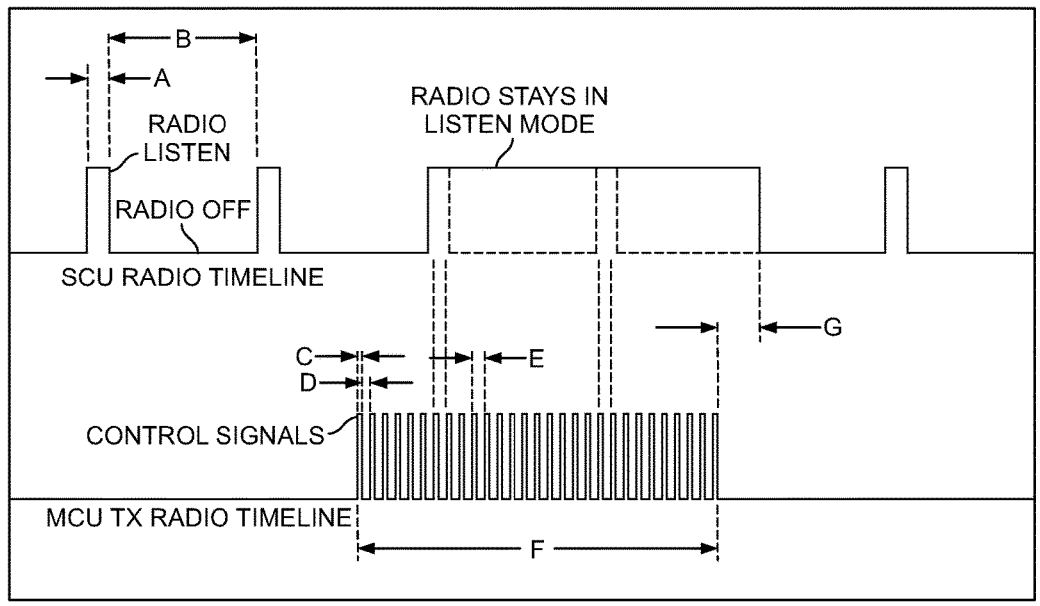
FIG. 11 is a timeline of the SCU transmitter and receiver and the MCU transmitter and receivers.

FIG. 11 shows the transmitter and receiver timing when shift signals are transmitted from the MCU 44 to the SCU 66, 86. After a shift button 38 on the shift unit 24 is pressed, the MCU 44 enters a wake mode or state, waits for the channel to become clear, and transmits a series of duplicate control/shift signals if no other signals or noise is detected. Each of the duplicate shift signal has a duration time of C (about 1 ms) followed by a rest period time D (about 2 ms)

and is repeated for a length of time, i.e., a message duration time F (about 100 ms). The message duration time F is chosen so that the shift signal from the MCU 44 will coincide with at least one time when the transmitter and receiver 80, 100 of the SCU 66, 86 is actively monitoring or listening, i.e. in a listen mode. In the example shown in FIG. 11, four control signals coincide with the time the SCU transmitter and receiver 80, 100 is in listen mode, as illustrated by the dashed lines. In other words, the gear changer transmitter and receiver actively listens for the shift signals from the shifter transmitter and receiver during a part of an awake mode cycle time and the shifter transmitter and receiver is configured to transmit the shift signals for a length of time which is greater than the awake mode cycle time to ensure that the gear changer transmitter and receiver will be in a state of active listening when a shift signal is being transmitted, wherein listening may also be referred to as monitoring.

When the SCU transmitter and receiver 80, 100 hears a shift or control signal, the SCU 66, 86 keeps the transmitter and receiver in listen mode, even if the detected signals are intended for another device. The SCU transmitter and receiver 80, 100 will stay in listen mode for a listen duration time G (about 20 ms) after the last signal is received before going back to sleep, i.e. the non-listen mode, to conserve power. It will be understood that the various timings illustrated herein are exemplary in nature.

During racing or large group rides it is inevitable that cyclists will be using a number of systems in detectably close proximity. Both the MCU 44 and SCU 66, i.e., 86, may have special features to enable coexistence and ensure high reliability during crowded use. The MCU transmitter and receiver 54 has the ability to both transmit and receive signals. Prior to transmitting a wireless signal, the MCU 44 will listen to determine if other transceivers or devices are transmitting. These other transceivers may or may not be part of the instant system. When the MCU 44 hears other transceivers, prior to transmitting, it will observe the device ID(s) of the other signal(s) and count these devices until it sees a device repeated. When the MCU 44 determines that the channel is clear to transmit after hearing other transmissions, (i.e., any transmission that is not from a master control unit to which either of the SCUs 66, 86 is paired, wherein the other transmissions may be referred to as noise), it will begin transmitting a signal but may adjust the repeat interval by increasing the time between transmissions of the duplicate signals to avoid collisions with the other transmissions/noise.

Figure 12:
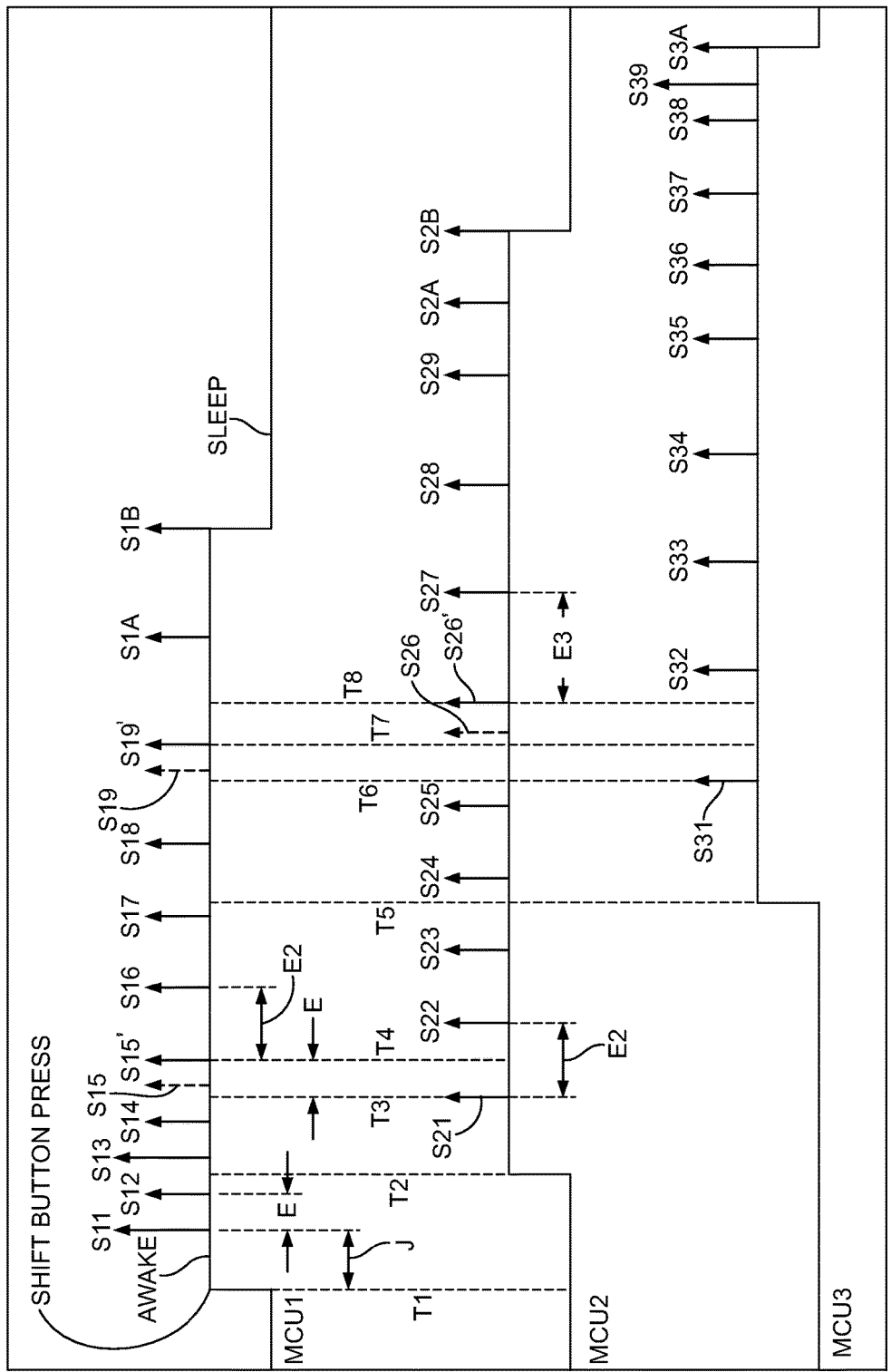
FIG. 12 is a wake/sleep/TX timeline of the MCUs.

FIG. 12 shows the interaction of three MCUs that attempt to transmit at the same time. The timeline MCU1 shows the sleep (low power mode), wake (fully powered and including an actively monitoring mode), and transmit (TX) states of the first MCU. When a shift actuator is operated, the MCU wakes and pauses to listen for a quiet time (J) before transmitting signals (S11-S14). Since no other signals or noise in this example were heard during quiet time J, S11-S14 are repeated at a minimum repeat rate E (about 3 ms). When the MCU is awake, between transmitting signals, it listens for signals from other transmitters.

MCU2 wakes from a TX command request and begins listening at time T2. After MCU2 receives signal S13 and S14, both from a common MCU, it determines that two devices will be transmitting and begins sending signals S21-S25 at time T3 and at a repeat rate E2, about 6 ms. MCU2 transmits signal S21 at time T3 before S15 of MCU1, thus "bumping" S15. MCU1 was listening between S14 and the planned S15 signal and heard the signal S21 from MCU2. MCU1 then cancels S15 and begins sending a new signal S15'-S18 starting at time T4 at repeat rate E2. MCU1 chooses to send signal S15' about 3 ms from T3, maintaining an interval between duplicate signals at a first interval or environmental signal repeat rate of about 3 ms.

MCU3 wakes prompted by detection of a TX command request (shift signal) and begins listening at time T5. After MCU3 receives signal S24, S18, and S25, where S24 and S25 are both from a common MCU, it determines that three devices will be transmitting and begins sending signals S31-S35 at time T6 and at a repeat rate E3, about 9 ms. Signal S31 was transmitted prior to the planned signal S19 of MCU1. MCU1 was listening between signals S18 and planned S19 and received S25 from MCU2 and S31 from MCU3. MCU1 then cancels S19 and begins sending a new signal S19'-S1B starting at time T7 at repeat rate E3. MCU1 chooses to send signal S19' about 3 ms from T6, maintaining an environmental signal repeat rate of about 3 ms. Signal S19' was transmitted prior to the planned S26 of MCU2, bumping that signal. MCU2 was listening between signals S25 and planned S26 and received S31 from MCU3 and S19' from MCU1. MCU2 then cancels S26 and begins sending a new signal S26'-S2A starting at time T8 at repeat rate E3. MCU2 chooses to send signal S26' about 3 ms from T7, maintaining an environmental signal repeat rate of about 3 ms.

Between S28 and S29, MCU2 observed that only S34 was received from MCU3 and determines that only two devices are now communicating. After S29, MCU2 sends signals S2A-S2B at the increased repeat rate E2. Between S34 and S35, MCU3 observed that only S29 was received from MCU2 and also determines that only two devices are now communicating. After S35, MCU3 sends signals S35-S38 at the increased repeat rate E2. Between S37 and S38, MCU3 observed that no signals were received and it alone is communicating. After S38, MCU3 sends signals S38-S3A at the increased repeat rate E.

Although the example above describes the transmitters adjusting their repeat intervals on the next transmit cycle, it may be desirable to wait more than one cycle before adjusting the repeat rate. This gives the transmitters more chances to notice other transmitters they might not have noticed on their initial tally.

There is a risk that two devices will attempt to send signals at exactly the same time. To reduce the possibility of collisions, the signal repeat rate E may be randomly varied by as much as plus/minus 1 ms, for example.

Also, the invention may include a method to maximize reliability thereof by maximizing the number of sent duplicate shift signals corresponding to the input signal in a given message duration time. If the repeat interval of the plurality of duplicate shift signals creates a situation where only a small number of duplicate shift signals can be transmitted, the system may increase the length of the message duration time to transmit a sufficient number of the duplicate signals at the increased interval rate.

Handling Duplicate Shift Commands

Because the MCU 44 of the shifter 24 sends the shift signal multiple times, the SCU 66, 86 of the gear changers 30, 28 need a method of discerning duplicate received shift signals from new shift signals. When the MCU 44 generates a shift signal it also generates a "count value" that is transmitted along with the device ID and device type. Each time a new shift signal is generated by the SCU 66, 86 a new count value is generated by retrieving the previous count value from memory and increasing the value by one (1) to obtain a new count value. When the SCU 66, 86 receives a shift signal it compares received count value to the previously received count value stored in the SCU memory 72, 92 for that signal type (ex: upshift, downshift) and device type (right shifter, left shifter). If the count value, signal type, and device type match the values stored in memory, the command is ignored as it is a duplicate signal that has already been processed. If the count value is different than the value stored in memory, the SCU 66, 86 will calculate a value "pending" by subtracting the count value in memory from the received count value. If the operator pushes the upshift lever once and no wireless transmissions were lost, the SCU 66 calculates a value of pending=1 and executes a command to the motor unit 64 to upshift once. Then the SCU 66 will record the new count value to memory for that signal type and device type. However, if the operator is rapidly pressing the upshift lever 38 and the system 22 is in a noisy wireless environment where wireless signals fail often, the SCU 66 may calculate a pending value greater than one. In this case a shift signal was lost, or the operator pressed the lever 38 more than once before the SCU 66 turned its transmitter and receiver on. If the SCU 66 receives a shift signal corresponding to an upshift input signal and calculates a pending value of 3, it is known that the upshift lever 38 had been operated three (3) times since the last shift signal corresponding to an upshift input signal was received, and will send a command to the motor unit 64 to upshift three (3) times. Then the SCU 66 will record the new count value to memory for that signal type and device type. The SCU 66 will also ignore signals corresponding to upshift or downshift input signals when the gear changer 30 is at the limit of its range. For this to occur, the SCU 66 will keep track of its position.

Other Shift Methods

The MCU 44 can also generate control signals regarding the state of the shift buttons 38 (upshift & downshift). For example, when an upshift button 38 of unit 24a is pressed, the MCU transmits an "upshift button pressed" signal and when the upshift button is released, transmits an "upshift button released" signal. This feature is useful in a system 22 where there is no dedicated front gear changer shift button 42 on the shift units and the front gear changer 28 is toggle shifted by pressing the upshift and downshift buttons 38 of both units 24a, 24b together. In the case of a front shift, the SCUs 66, 86 will first receive both an upshift & downshift button-pressed signal before receiving an upshift or downshift button-released signal, indicating that both buttons were pressed before either is released. When the SCU 86 of front gear changer 28 receives this signal sequence it will perform a front gear changer toggle shift. When the rear gear changer 30 receives this signal sequence, it will ignore them.

If the rear gear changer SCU 66 receives an upshift or downshift button-released signal without first receiving an upshift or downshift button-pressed signal, it can infer that the button-closed signal was lost or not transmitted from the MCU 44 because the button 38 was rapidly pressed and released. In this case the rear gear changer SCU 66 will go ahead and perform the upshift or downshift.

Although transmitted signals have only been described from the MCU 44, the SCU 86, 66 in the front gear changer 28, and rear gear changer 30 may also send signals to other devices. For example, the rear gear changer 30 can send a message to the front gear changer 28 indicating the current gear position of the rear gear changer. This would allow the front gear changer 28 to optimize the trim position of the front gear changer based on the position of the rear gear changer 30. Other types of data the SCU 66, 86 of a device could transmit include battery level, number of shifts, device ID, temperature, error codes, firmware version, etc.

ANT/BTLE Bridge

It is also possible for the present system 22 to communicate with other third party devices using standard protocols such as ANT or Bluetooth Smart (BTLE). One of the devices in the system can collect data from the other devices such as battery level, gear position, firmware version, etc. and share the data with a third party device using a different communication protocol, effectively operating as an information bridge.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A wireless control system for a bicycle, comprising:
   at least one shift unit including a shift actuator and a master control unit in communication with the shift actuator;
   the master control unit transmitting on a channel and listening for noise on the channel and after receiving an input signal from the shift actuator transmitting a plurality of shift signals corresponding to the input signal for a message duration time if the channel is free of noise.

2. The wireless control system of claim 1, wherein the master control unit wakes upon receipt of the input signal from the shift actuator.

3. The wireless control system of claim 1, wherein the master control unit alters the time between the transmissions of the shift signals so that the shift signals do not occur during the noise.

4. The wireless control system of claim 1, wherein each of the plurality of shift signals is spaced from an adjacent one of the shift signals according to a first interval.

5. The wireless control system of claim 4, wherein the master control unit listens on the channel for noise between each of the plurality of shift signals.

6. The wireless control system of claim 5, wherein the master control unit alters the transmissions of the shift signals if noise is detected by extending the time between adjacent ones of the plurality of shift signals such that the shift signals are not transmitted during the noise.

7. The wireless control system of claim 6, wherein the master control unit transmits the shift signals if noise is detected according to a second interval, the second interval being greater than the first interval.

8. The wireless control system of claim 7, wherein the second interval is about twice that of the first interval.

9. The wireless control system of claim 8, wherein the first interval is about 3 milliseconds.

10. The wireless control system of claim 1, further comprising a pair of shift actuators, each of the pair of shift actuators including a master control unit.

11. The wireless control system of claim 1, further comprising a pair of shift actuators and a master control unit common to both of the pair of shift actuators.

12. The wireless control system of claim 1, further comprising at least one gear changer control unit paired with the master control unit to receive the plurality of shift signals and act responsively thereto.

13. The wireless control system of claim 10, further comprising a pair of gear changer control units, each of the pair of gear changer control units paired with each of the master control units.

14. The wireless control system of claim 3, wherein the time between the transmissions of shift signals is randomly varied to reduce the chance of collisions.

* * * * *